(12) United States Patent
Wakim et al.

(10) Patent No.: US 11,622,287 B2
(45) Date of Patent: Apr. 4, 2023

(54) UPGRADE RECOMMENDATIONS FOR WIRELESS WIDE AREA NETWORKS

(71) Applicant: Verizon Patent and Licensing Inc., Basking Ridge, NJ (US)

(72) Inventors: John N. Wakim, Salem, NH (US); Findlay Faubion, Yakima, WA (US); Paul Kerl, East Arlington, MA (US); Michael Antony Raj, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/908,890

(22) Filed: Jun. 23, 2020

(65) Prior Publication Data

US 2021/0400501 A1 Dec. 23, 2021

(51) Int. Cl.
*H04W 24/02* (2009.01)
*H04W 16/24* (2009.01)
*G06Q 30/0201* (2023.01)
*H04W 76/27* (2018.01)
*H04M 15/00* (2006.01)
*H04W 16/18* (2009.01)

(52) U.S. Cl.
CPC ........ *H04W 24/02* (2013.01); *G06Q 30/0201* (2013.01); *H04M 15/58* (2013.01); *H04W 16/18* (2013.01); *H04W 16/24* (2013.01); *H04W 76/27* (2018.02)

(58) Field of Classification Search
CPC .............. G06Q 30/0201; H04M 15/58; H04M 2215/0188; H04W 16/00–32; H04W 24/00–08; H04W 76/27; H04W 28/0958
See application file for complete search history.

(56) References Cited

U.S. PATENT DOCUMENTS

| | | | |
|---|---|---|---|
| 6,526,279 B1 * | 2/2003 | Dent ................. | H04W 36/0085 455/437 |
| 6,628,952 B1 * | 9/2003 | Hankins ................ | H04W 16/00 455/446 |
| 2004/0214583 A1 * | 10/2004 | Graham ................ | H04W 16/22 455/446 |
| 2006/0223546 A1 * | 10/2006 | Claussen ............... | H04W 24/02 455/436 |
| 2009/0191915 A1 * | 7/2009 | Abramson .............. | H04W 8/02 455/410 |

(Continued)

FOREIGN PATENT DOCUMENTS

| EP | 3068176 A1 * | 9/2016 | .......... H04W 52/143 |
|---|---|---|---|
| WO | WO-2010017219 A2 * | 2/2010 | ............ H04W 16/04 |

*Primary Examiner* — Ronald Eisner (57) ABSTRACT

A method to generate upgrade recommendations for wireless wide area networks may include receiving parameters associated with an existing network configuration, customer usage, and a network demand, and identifying recommendations for locations of potential new cell sites corresponding with sectors within a geographical region associated with the network, where the identifying is based on the existing network configuration and customer usage. The method may include predicting a performance impact on the network based on the recommendations for potential new cell site locations, and selecting network upgrades based on the recommendations for potential new cell site locations, the network demand, and the predicted performance impact.

20 Claims, 8 Drawing Sheets

(56) References Cited

U.S. PATENT DOCUMENTS

| | | | | |
|---|---|---|---|---|
| 2010/0232529 A1* | 9/2010 | Fettweis | ................ | H01Q 1/246 375/260 |
| 2010/0271994 A1* | 10/2010 | Wolfe | ............... | H04W 52/0264 370/311 |
| 2014/0105134 A1* | 4/2014 | Buddhikot | ............ | H04L 5/0058 370/329 |
| 2015/0031327 A1* | 1/2015 | Townley | ............... | H04W 16/18 455/405 |
| 2015/0215128 A1* | 7/2015 | Pal | ...................... | H04L 63/0815 713/155 |
| 2015/0334576 A1* | 11/2015 | Sofman | ................... | G01S 5/021 455/456.1 |
| 2017/0150365 A1* | 5/2017 | Goswami | .............. | H04W 16/18 |

* cited by examiner

Solid Circle: too close for small cell/micro cell
Dashed Circle: too close for macro cell

UPGRADE RECOMMENDATIONS FOR WIRELESS WIDE AREA NETWORKS

BACKGROUND

Increased demand for wireless networking services drives the deployment of wireless wide area network (WWAN) upgrades. The WWAN upgrades are designed to improve performance, availability, and/or reliability of wireless communication among various network infrastructure devices and/or mobile devices. Since the infrastructure of the WWAN can be highly complex and extend over large geographical regions, conventional approaches for deploying new sites and upgrading existing equipment can be resource intensive and time consuming.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to upgrade recommendations for wireless wide area networks (WWAN). In an embodiment, an automated system and/or method may create an optimized list of geo-located cell site upgrades and capacity driven cell site placements. In formulating recommendation upgrades, embodiments may consider, for example, variables such as current cell site configurations, radio frequency (RF) conditions, topography, location of existing cell sites, geolocated projected usage and/or current usage, out of millions of potential new cell site location placements optimized across a large geographical region (e.g., across the United States).

Various embodiments may automate and optimize site placement recommendations through capacity offload prediction, and may subsequently translate the prediction into upgrade recommendations. Such recommendations may include, for example, performance, reliability, and/or network upgrades. These recommendations, for example, may include carrier additions, antenna upgrades, and/or new cell site build placements. New cell site builds may be based on Fifth Generation (5G) standards (including New Radio (NR) air interface standards), Long Term Evolution (LTE) wireless standards (e.g., LTE, LTE Advanced, etc.), and/or any other existing WWAN standards. Accordingly, new cell site builds may include macro cell sites, small cell sites, and/or ultra wide-band (UWB) nodes. As used herein, "recommendations" may include various guides, rules, and/or detailed plans of action for optimizing WWAN capability. As used herein, the term "optimize" or "optimization" of the WWAN upgrades may be generalized to include WWAN upgrades that make improvements to the performance and functionality of the WWAN, in addition to upgrades that may make the best and/or most effective improvements to the performance and/or functionality the WWAN based upon available resources.

Figure 1:
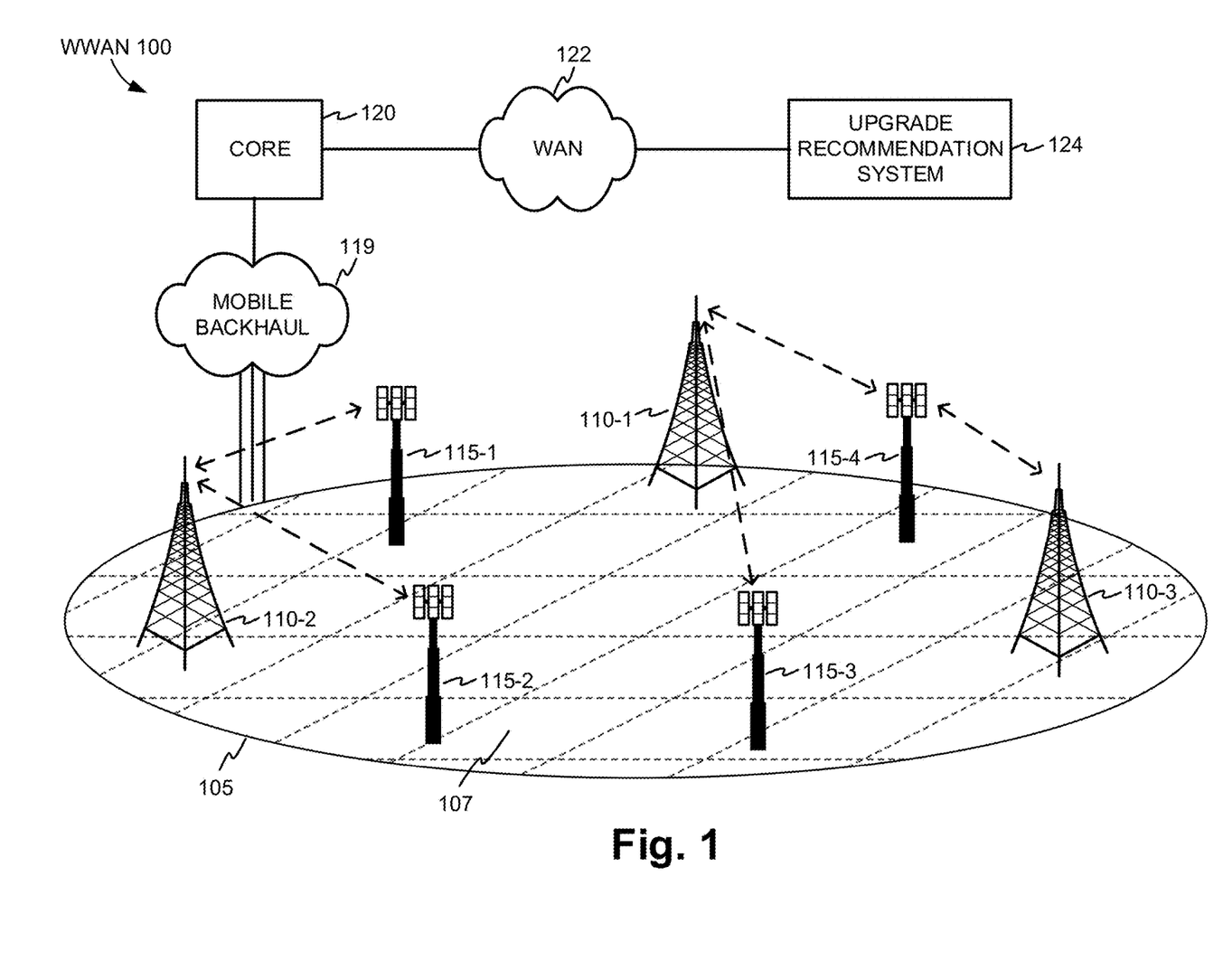
FIG. 1 is a diagram showing an exemplary WWAN environment associated with an upgrade recommendation system according to an embodiment.

FIG. 1 a diagram showing an exemplary WWAN 100 environment associated with an upgrade recommendation system (URS) according to an embodiment. WWAN environment 100 may include a geographical region 105, a positioning reference system made up of a plurality of bins 107, cell sites 110 (herein referred to plurally as "cell sites 110," generically as "cell site 110," and individually as "cell site 110-x"), potential new cell sites 115 (herein referred to plurally as "potential new cell sites 115," generically as "potential new cell site 115" and individually as "potential new cell site 115-x"), mobile backhaul 119, core 120, WAN 122, and URS 124.

Cell sites 110 may exchange traffic data with core 120 via mobile backhaul network 119. In some embodiments, mobile backhaul network 119 may further exchange data between cell sites 110 without having to go through core 120. Core 120 may further exchange data via WAN 122 to communicate with other various network devices. In the embodiment illustrated in FIG. 1, URS 124 may be included in WWAN 100 and exchange data with other network devices via WAN 122 and/or core 120. However, in other embodiments, URS 124 may not be interconnected to WWAN 100.

One or more sectors associated with cell sites 110 within geographical region 105 may be selected as candidate(s) for recommendations for various upgrades. As used herein, a sector may refer to a portion of a cell site 110-x which produces a wireless coverage area. In an embodiment, the selection of sectors of cell sites 110 recommended for upgrades may be automatically determined by URS 124 based on "capacity triggers." As used herein, a capacity trigger may be defined as one or more sectors and/or cell sites 110 which may benefit from additional communications capacity based on demand from users and/or other devices (e.g., internet of things (IoT) devices). The desirability of additional capacity for WWAN 100 may be determined, for example, through measurements indicating the amount of data exchanged within WWAN 100, the average headroom and/or capacity for additional data exchange within WWAN 100, error rates and/or congestion metrics exceeding predetermined thresholds over designated periods of time. Additionally or alternatively, the desirability for additional capacity may be based on quality metrics associated with WWAN 100, such as, for example, the number of dropped calls and/or packets, perceived voice quality, delay, and/or other quality metrics based on user feedback. As used herein, the term "additional capacity" for WWAN 100 within geographical region 105 may refer to, for example, upgrades providing the ability to: wirelessly exchange more data; increase speed of data throughput; reduce latency; increase bandwidth; increase wireless coverage within geographical area 105; service a greater number of users within geographical area 105; and/or provide additional services and/or protocols (e.g., multimedia broadcast multicast service).

In an embodiment, URS 124 may provide upgrade recommendations for WWAN 100 by initially determining locations of plurality of potential new cell sites 115 (e.g., 5G cell sites), and the type of cell site that would be most appropriate (e.g., small cell, macro cell, etc.). The locations of potential new cell sites 115, as well as the locations of existing cell sites 110, may be specified by identifying a particular bin 107 in which they are positioned. Bins 107 may be any shape and size. For example, each bin 107 may be square shaped and have a dimension of 0.1 mile×0.1 mile, or some other specified size. Each bin 107 may be uniquely identified by an integer, string, or any other data type (e.g., k_bin, where k=1, . . . , N), where the value N may be a large enough integer so that uniquely identifiable k_bins 107 may extend over vast geographical regions (e.g., a city, state, and/or the entire United States).

Once the locations of potential new cell sites 115 are determined, the offload potential (i.e., the reduction in exchanged data of existing cell sites 100) of each potential new cell site 115 may be predicted to determine their efficacy for improving WWAN 100. For example, as shown in FIG. 1 the offload potential of potential cell sites 115-1 and 115-2 may be predicted for existing cell site 110-2. Similarly, the offload potential of potential new cell sites 115-3 and 115-4 may be predicted for existing cell sites 110-1 and 110-3. Using these performance predictions, along with a variety of other information (as will be discussed in reference to FIGS. 2 and 3, optimization techniques may be used to determine the most appropriate recommendation for upgrades to WWAN 100.

Further referring to FIG. 1, cell sites 110 and/or potential new cell sites 115 may operate with any type of radio access network, and can be compatible with known wireless standards. Such wireless standards may include, for example, fifth generation (5G) (e.g., New Radio), fourth generation (4G) (e.g., LTE, LTE Advanced), GSM, UMTS, IS-2000, etc. In some embodiments, cell sites 110 may include a wireless access point which can service any type of Wi-Fi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16. Cell sites 110 and/or potential new cell sites 115 may be embodied as any type of known cell site, which may include, for example, macro cells, micro cells, femto cells, etc.

Mobile backhaul network 119 may be any type of network which supports one or more cell sites 110 and potential new cell sites 115 for interfacing with core 120. Mobile backhaul network 119 may include Cell Site Routers (CSRs), Extended Backhaul (EBH) network(s), optical networks which include wavelength division multiplexed (WDM) optical components, multiservice provisioning platforms (MSPPs), metro-Ethernet networks, etc.

Core 120 may be any type of wide area wireless core networking infrastructure that provides, for example, wireless connectivity, mobility management, session management, broadcast (e.g., evolved multimedia broadcast multicast service (eMBMS)) functionality, authentication, and/or packet transport to support wireless communication between mobile devices and cell sites 110 and/or potential new cell sites 115. Core 120 may be compatible with known wireless standards which may include, for example, 4G (e.g., LTE, LTE Advanced, etc.), 5G (e.g., New Radio), Global System for Mobile Communications (GSM), Universal Mobile Telecommunications System (UMTS), IS-2000, etc.

WAN 122 may include any type of wired or wireless network covering larger areas. For example, WAN 122 may include a metropolitan area network (MAN), a Public Switched Telephone Network (PSTN), an ad hoc network, an intranet, the Internet, a fiber optic-based network, a wireless network, and/or a combination of these or other types of networks. WAN 122 may be an internet protocol (IP) based network or utilize Multi Protocol Label Switching (MPLS), and may include a mesh network (e.g., IEEE 801.11s) and/or a WiMAX IEEE 802.16. WAN 122 may include one or more circuit-switched networks and/or packet-switched networks.

URS 124 may be any type of network device which may receive data traffic, network utilization information, and/or network configuration information regarding WWAN 100, and generate and provide upgrade recommendations for WWAN 100. Accordingly, URS 124 may be implemented as a general processor-based system executing software (e.g., a server or other network device), embodied using dedicated hardware (e.g., ASICs, FPGAs, etc.), or as a combination thereof. URS 124 may interface to core 120 thorough WAN 122 (as shown in FIG. 1), or may alternatively connect to 120 through a local interface. URS 124 may interface to WAN 122 using an Ethernet connection over transmission control protocol/internet protocol (TCP/IP), where the physical interfaces may be any interface having sufficient resources to support the exchange of traffic alerts and traffic notifications. An interface may include, for example, 10BASE-T, 1000BASE-TX, and/or 1000BASE-T over twisted pair, coaxial cable, and/or optical fiber. Alternatively, URS 124 may connect with core 120 over a local area network using Ethernet and TCP/IP based networking standards.

Figure 2:
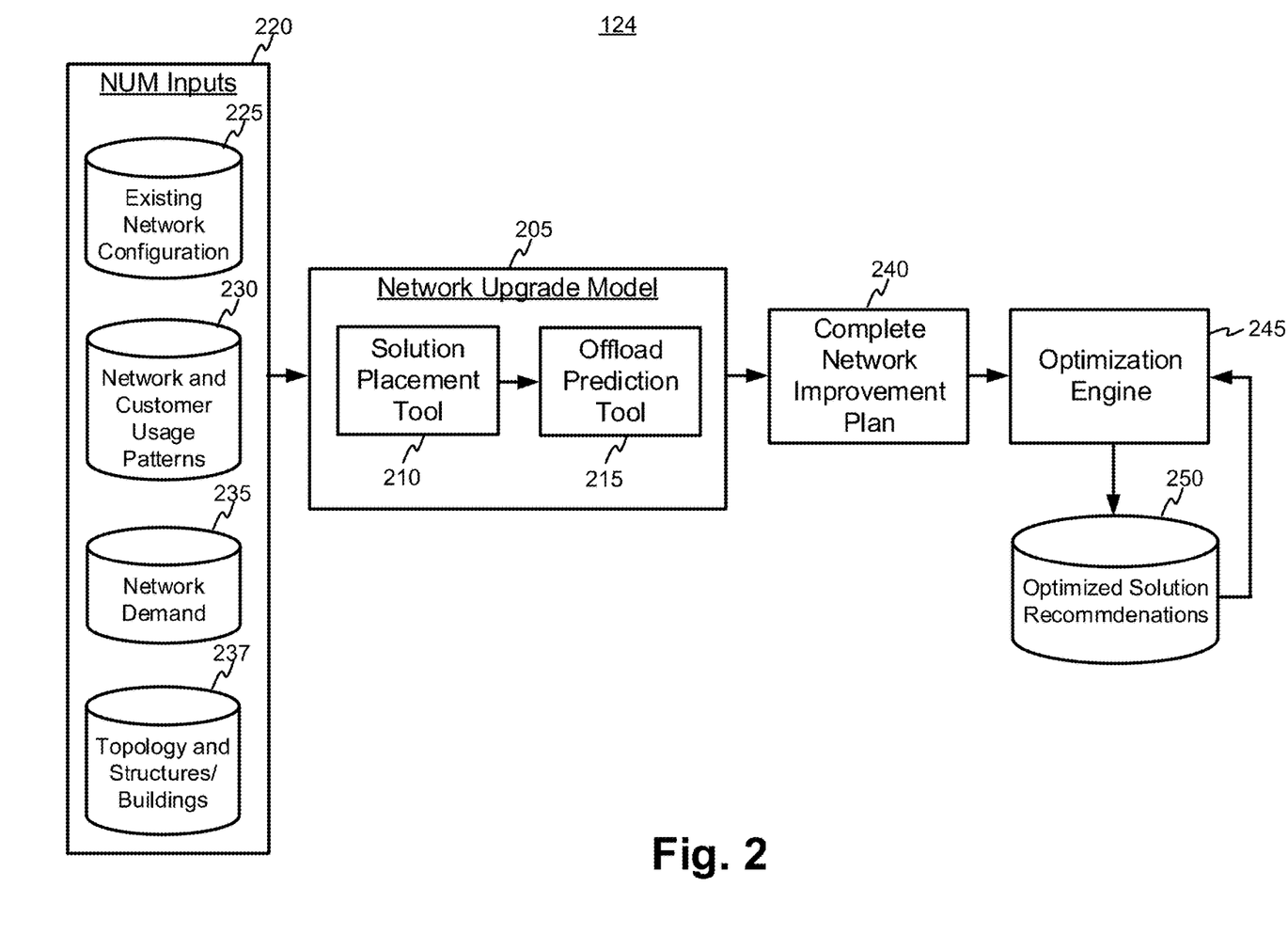
FIG. 2 is a block diagram showing an exemplary upgrade recommendation system according to an embodiment.

FIG. 2 is a block diagram illustrating an exemplary upgrade recommendation system (URS) 124 according to an embodiment. URS 124 may include network upgrade model (NUM) 205, which further includes solution placement tool (SPT) 210, and offload prediction tool (OPT) 215. URS 124 further includes NUM inputs 220, including existing network configuration data 225, network and customer usage patterns 230, and network demand 235. URS 124 further includes complete network improvement plan 240, optimization engine 245, and Optimized Solution Recommendations 250.

In an embodiment, NUM 205 may automatically determine potential new cell site placement recommendations within geographical region 105, and then determine the offload potential of each potential new cell site placement within the existing WWAN 100. Specifically, SPT 210 may automatically determine possible locations of potential new cell sites 115 in geographical region 105, where the locations may be specified by specific bins 107 (e.g., k_bin, k=1, . . . , N). Additionally, SPT 210 may further determine predicted network settings (e.g., expected transmission radius), and/or cell site types (e.g., macro cell, micro cell, etc.) for each of the potential new cell sites 115. SPT 210 may provide all possible locations for recommended solutions (e.g., in high usage areas) based, for example, on k_bins to OPT 215. Additionally, SPT 210 may provide predicted network settings and/or cell site types to OPT 215 to predict their effects in WWAN 100 as described below.

OPT 215 may estimate the data throughput of the potential new cell sites by modelling the effectiveness of all of the potential new cell sites 115 in offloading data traffic from existing cell sites 110. OPT 215 may produce a ranked list for possible locations of potential new cell sites 115, where the ranking is based upon the improvement each potential new cell site 115 may provide with respect to traffic handled by existing cell sites 110. OPT 215 may also predict the associated customer impact of any recommended network improvement. The modelling used by OPT 215 may take into account actual data flows over time which are experienced by existing cell sites 110, which may be measured using conventional techniques, such as, for example, packet trace traps placed within WWAN 100. Actual data flows may also be measured from one or more mobile devices at various positions within geographic region 105. In an embodiment, mobile devices may further provide position data (e.g., global position data (GPS), and/or data which may be used to determine/refine position (e.g., time delay, signal strength, etc.) to OPT 215. OPT 215 may use mathematical models of WWAN 100 to predict the effectiveness of solutions determined by SPT 210. By using SPT 210 and OPT 215 together, the effectiveness of potential new cell sites 115 may be ranked subsequent for use in downstream modules such as, for example, Complete Network Improvement Plan (CNIP) 240 and Optimization Engine 245, for determining optimal network upgrade recommendations.

NUM inputs 220, which may be received by NUM 220 for use by SPT 210 and OPT 215, include information regarding the existing network topology and surrounding environment which may affect radio transmission, and customer usage information/demand to assist in recommending potential new cell sites 115 and/or upgrades to existing cell sites 110. For example, NUM inputs 220 may include existing network configuration (ENC) 225, network and customer usage patterns (NCUP) 230, network demand (ND) 235, and topology and structures/buildings (TSB) 237. ENC 225 takes into account the location of existing cell sites 110, the wireless coverage of existing cell sites 110, the surrounding geography such as topology, water bodies, etc., the configuration and/or orientation of the antennas for existing cell sites 110, power levels and/or ranges of existing cell sites 110, etc. NCUP 230 may include histories of data flows with WWAN 110 as a function of time, and identification of patterns of data flows through existing cell sites 110. In an embodiment, NCUP 230 may further use timeslot and radio resource control (RRC) data to infer usage patterns. Additionally or alternatively, measurements of data flows may be determined using data exchanged with mobile device(s) distributed within one or more bins 107, wherein the identity of a particular bin (e.g., k_bin) may provide location information of the mobile device. ND 235 may characterize existing and future customer demand for network services, including the amounts of data, the types of data, the priorities of data flows, etc. TSB 237 may include information relating to the natural topology of geographic region 105 (e.g., topological mappings, locations of water bodies, marshes, hills, soil types, etc.); and information relating to man-made structures and buildings (e.g., location, size, materials of construction, etc.).

Further referring to FIG. 2, NUM 205 provides output to Complete Network Improvement Plan (CNIP) 240, which may include a large number of ranked network improvement solutions geographical area 105 (e.g., over 5 million potential new cell site locations). Accordingly, CNIP 240 provides a nearly comprehensive set of recommendations for improving WWAN 100 for use by optimization engine (OE) 245. OE 245 may anticipate WWAN capacity based on upgrades to existing cell sites 110 and/or locations of potential new cell sites 115 and upgrades to existing cell sites by modeling a list of targeted cell site sectors and solutions for capacity planning. OE 245 may process through a large number of scenarios to automatically determine optimal recommendation upgrades based on the information from the CNIP 240, where the optimal recommendation upgrades maximize customer impact given various constraints (e.g., operational constraints, resource constraints, etc.). The optimal recommendation upgrades may be stored in the optimized solution recommendations (OSR) database 250, of which may be numerically reduced by a significant number from the number of solutions originally presented by CNIP 240 (e.g., 30,000 recommendations for potential new cell site locations). Additionally, to ensure no duplicate solutions exist, or that solutions overlap in wireless coverage, OE 245 may further iterate on the solutions in OSR database 250. Details of OE 245 are described in more detail below in reference to FIG. 3. The embodiment for URS 124 shown in FIG. 2 is merely exemplary and, other implementations may include fewer components, different components, differently arranged components, or additional components than exemplified in FIG. 2. Additionally or alternatively, one or more components of URS 124 may perform functions described as being performed by one or more other components.

Figure 3:
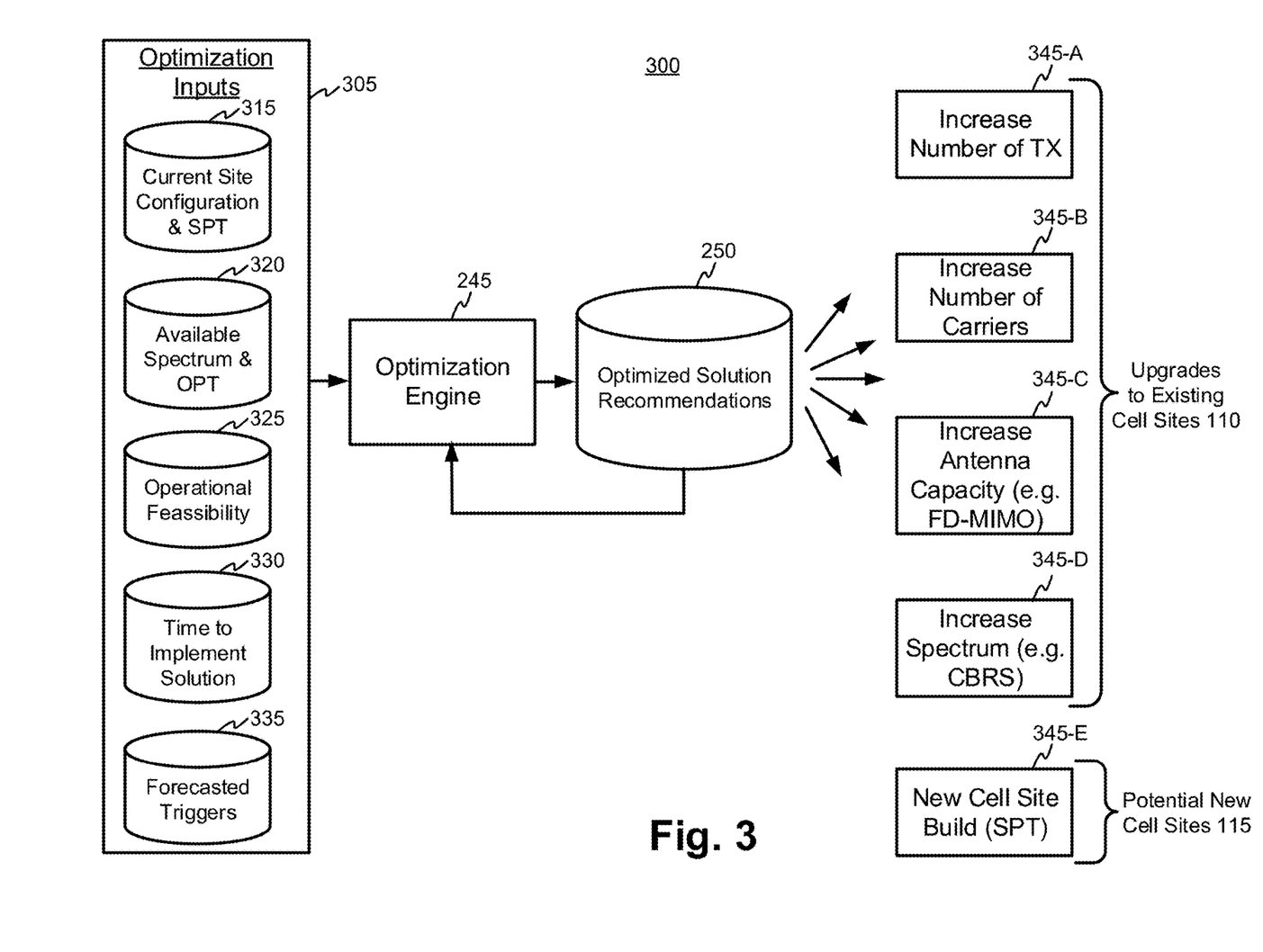
FIG. 3 is a block diagram illustrating an exemplary process associated with an optimization engine according to an embodiment.

FIG. 3 is a block diagram illustrating details of an exemplary optimization flow 300 according to an embodiment. Optimization flow 300 may include OE 245, which receives optimization inputs 305 to produce optimized solution recommendations (OSR) 250. OSR 250 may be determined for sectors having actual and/or projected constraints. That is, the solutions determined by optimization engine 245 may be associated with sectors in existing cell sites 110 which may already be experiencing congestion in data traffic flows and would immediately benefit from increased data capacity. In other embodiments, optimization engine 245 may provide OSR 250 for sectors that are predicted to have congestion in data traffic in the future, based on foreseeable growth in WWAN 100 usage (e.g., forecasted capacity triggers 335).

OSR 250 may rely upon one or a combination of approaches for implementing improvements to WWAN 100, which may include, for example, upgrades to existing cell sites 110 that: increase the number of transmitters (TX) 345-A; increase the number of carriers 345-B; increase antenna capacity (e.g., frequency division multiple input multiple output (FD-MIMO) 345-C; and/or increase spectrum 345-D (e.g., add Citizens Broadband Radio Service (CBRS), provide carrier aggregation, utilize additional unlicensed spectrum, etc.). Optimized solution recommendations 250 may further include recommending new cell sites builds 345-E based on recommendations from SPT 210 and OPT 215. The solution recommendations may consider any combination of approaches 345-A through 345-E, and may further include future technologies (e.g., approaches associated with the 5G wireless communication standard).

In more detail, optimization flow 300 may be used for anticipating WWAN capacity in view of various potential upgrades by modeling a list of targeted cell site sectors and solutions for capacity planning. As inputs, optimization engine 245 may include current cell site 110 location/configuration and potential new cell site 115 location/configuration (via SPT 210) 315, available spectrum and OPT data 320, operational feasibility data 325, time to implement solution 330, and forecasted capacity triggers 335. From these inputs, OE 245 may use a multivariate optimization math model for arriving optimal solution recommendations 250, which may include, for example, a mixed integer linear programming problem (MILP) formulation. Decision variables designated by MILP may include whether to upgrade a specific cell site 110 (or portion thereof) or not. An objective function may be used by MILP which may, for example, maximize the highest customer impact or other objectives relating to upgrading the network (e.g., maximizing capacity added, and/or cell sites upgraded, etc.). Various constraints may be used in the optimization process. For example, constraints may include market area related constraints (where market can be any possible geographic boundary such as, for example, a cellular market area) to prevent overbuilding a site and/or underbuilding in cities or other market areas; operational feasibility constraints (e.g., limitations on quantity of builds per year); and/or decisions whether to upgrade cell sites 110 that are proximate to an existing cell site 110-$x$ which is to be upgraded. In some implementations, OE 245 may use a solution rejection feedback loop to improve the optimization process by training the algorithm to avoid specific rejected solutions in an automated manner. Thus, the rejection feedback loop may avoid inefficiencies and/or redundant solutions.

Accordingly, OE 245 determines practical recommendations based on business criteria (such as consumer demand), type of potential new cell site 115 (e.g., macro sector on tall tower versus small cell on telephone pole, structure type). In more detail, referring to FIG. 3, current site configuration and SPT data 315 may include information regarding existing cell sites 110 and potential new cell sites 115 (e.g., locations specified by k_bin value, cell types (e.g., macro-cell, micro-cell), transmission radius, etc.). Available spectrum and OPT data 320 may include the spectrum currently available for use within the geographical region 105, what spectrum may be available for licensing, etc. Operational feasibility 325 may include information associated with operating cell sites at geographical region 105, radio frequency (RF) interference issues, spectrum licensing, etc. Time to implement solution 330 may include implementation effort (e.g., time and/or manpower requirements based on cell site type, geography, etc.), and/or a measure of the level of effort required for upgrading existing cell sites 110 and/or installing potential new cell sites 115. Forecasted capacity triggers 335 include information providing indicators of one or more sectors in geographical region 105 which may benefit from upgrades implementing additional capacity. Determining forecasted capacity triggers 335 may be based on, for example: measurements indicating the amount of data exchanged within WWAN 100, wherein the measurements can be associated with specific times (e.g., rush hour); the average headroom and/or capacity for additional data exchange within WWAN 100; error rates; and/or congestion metrics. Additionally or alternatively, forecasted capacity triggers 335 may be based on quality metrics associated with WWAN 100, such as, for example, the number of dropped calls and/or packets, perceived voice quality, delay, and/or other quality metrics based on user feedback. By using forecasted capacity triggers 335, a provider may determine which geographical regions 105, and/or sectors therein, may receive the greatest benefit from upgrades to WWAN 100, thus maximizing the benefit for the effort expended in implementing upgrades to WWAN 100.

The embodiment for optimization flow shown in FIG. 3 is merely one implementation. Other implementations may include fewer components, different components, differently arranged components, or additional components than illustrated in FIG. 3. Additionally or alternatively, one or more components of optimization flow 300 may perform functions described as being performed by one or more other components.

Figure 4:
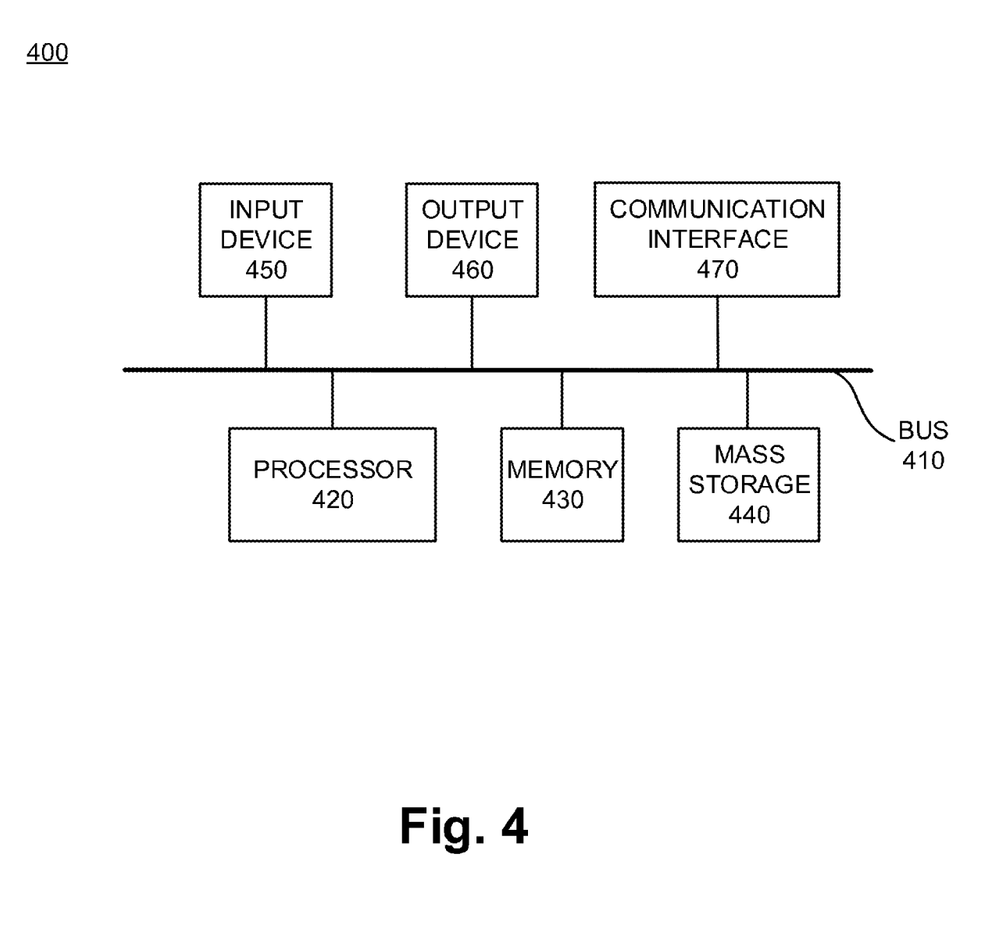
FIG. 4 is a block diagram illustrating components of an exemplary network device according to an embodiment.

FIG. 4 is a block diagram showing exemplary components of a network device 400. Network device 400 may be implemented in one or more components that reside in WWAN 100 and be a stand-alone device such as URS 124, SPT 210, OPT 215, OE 245, etc., or may be instantiated in software in another network device that may, for example, be included in core 120. Alternatively, network device 400 may reside outside WWAN 100 and be functionally coupled to WAN 122 and/or core 120. Network device 400 may include a bus 410, a processor 420, a memory 430, mass storage 440, an input device 450, an output device 460, and a communication interface 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, and/or a removable form of memory, such as a flash memory. Mass storage device 440 may include any type of on-board device suitable for storing large amounts of data, and may include one or more hard drives, solid state drives, and/or various types of Redundant Array of Independent Disk (RAID) arrays.

Input device 450, which may be optional, can allow an operator to input information into network device 400, if required. Input device 450 may include, for example, a keyboard, a mouse, a pen, a microphone, a remote control, an audio capture device, an image and/or video capture device, a touch-screen display, and/or another type of input device. In some embodiments, network device 400 may be managed remotely and may not include input device 450. Output device 460 may output information to an operator of network device 400. Output device 460 may include a display (such as a Liquid Crystal Display (LCD)), a printer, a speaker, and/or another type of output device. In some embodiments, network device 400 may be managed remotely and may not include output device 460.

Communication interface 470 may include a logical component that includes input and/or output ports, input and/or output systems, and/or other input and output components that facilitate the transmission of data to other devices. For example, communication interface 470 may include a network interface card (e.g., Ethernet card) for wired communications and/or a wireless network interface (e.g., a Wi-Fi) card for wireless communications. Communication interface 470 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 470 may further include one or more wired and/or wireless Radio Frequency (RF) transceivers that enable communications with WWAN 100 and/or other network devices (e.g., core 120) in WWAN 100. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 420. For example, the RF transceiver may perform analog-to-digital and digital-to-analog conversion, modulation and demodulation, up-conversion and down-conversion, and/or amplification of signals.

As described below, network device 400 may perform certain operations relating to generating recommendation upgrades for WWAN 100. Network device 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein, such as, for example, processes 500 depicted in FIG. 5 and/or process 600 depicted in FIG. 6. Alternatively, hard-wired circuitry may be used in place of, or in combination with, software instructions to implement processes described herein. Thus, implementations described herein are not limited to any specific combination of hardware circuitry and software.

Although FIG. 4 shows exemplary components of network device 400, in other implementations, network device 400 may include fewer components, different components, additional components, or differently arranged components than depicted in FIG. 4.

Figure 5:
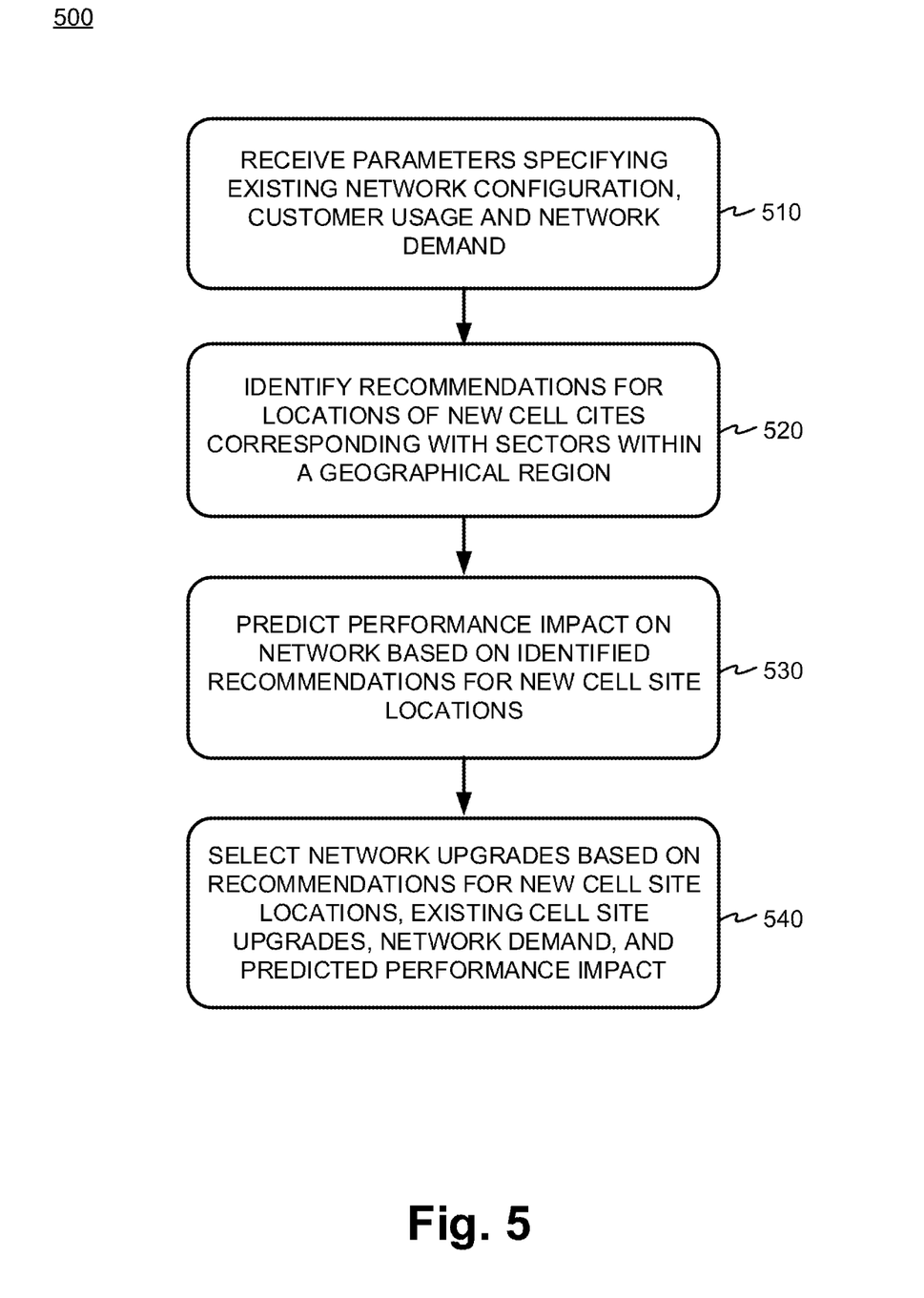
FIG. 5 is a flow chart of an exemplary process for providing upgrade recommendations for a wide area wireless network.

FIG. 5 is a flow chart showing an exemplary process 500 for generating upgrade recommendations for WWAN 100 according to an embodiment. Process 500 may be performed by network device 400, which may be external to core 120 (e.g., implemented in URS 124) and execute instructions by processor 420 for generating upgrade recommendations for WWAN 100. Alternatively, in another embodiment, network device 400 may be embodied as a network element residing in core 120 and perform additional standard network core functions in addition to generating upgrade recommendations for WWAN 100. Processor 420 may receive parameters, e.g., network upgrade model inputs 220, which specify an existing network configuration 225, network and customer usage patterns 230, and/or network demand 235 (Block 510). In an embodiment, the existing network configuration may include existing wireless coverage, existing cell site locations, time slot data, and/or radio resource control (RRC) data.

Processor 420 may identify recommendations for locations of potential new cell sites 115 corresponding to sectors within a geographical region 105 associated with a network (e.g., WWAN 100) (Block 520). Identifying recommendations may be based on the existing network configuration 225, customer usage patterns 230 and network demand 235. Further details regarding Block 520 are provided below in the description relating to FIG. 6.

Processor 420 may also predict a performance impact on the network based on the recommendations for potential new cell site locations (Block 530). In an embodiment, predicting the performance impact may include modeling the offload potential of the potential new cell sites for the sectors within the geographical region of the network.

Processor 420 may select network upgrades based on the recommendations for potential new cell site locations, the network demand, and the predicted performance impact (Block 540). In an embodiment, selecting network upgrades may include determining an optimal cell site upgrade based on forecasted capacity triggers, cellular market constraints, operational feasibility constraints, time implementation constraints, site configuration, and/or available spectrum. Network upgrades may be associated with the implementation of optimal cell site upgrades that may include at least one of adding additional transmission paths, providing additional carriers, improving a cell antenna, providing additional spectrum for one or more existing cell sites 110. Network upgrades may further include providing one or more potential new cell sites 115 within geographical region 105, where the locations of potential new cell sites may be specified by SPT 210.

Figure 6:
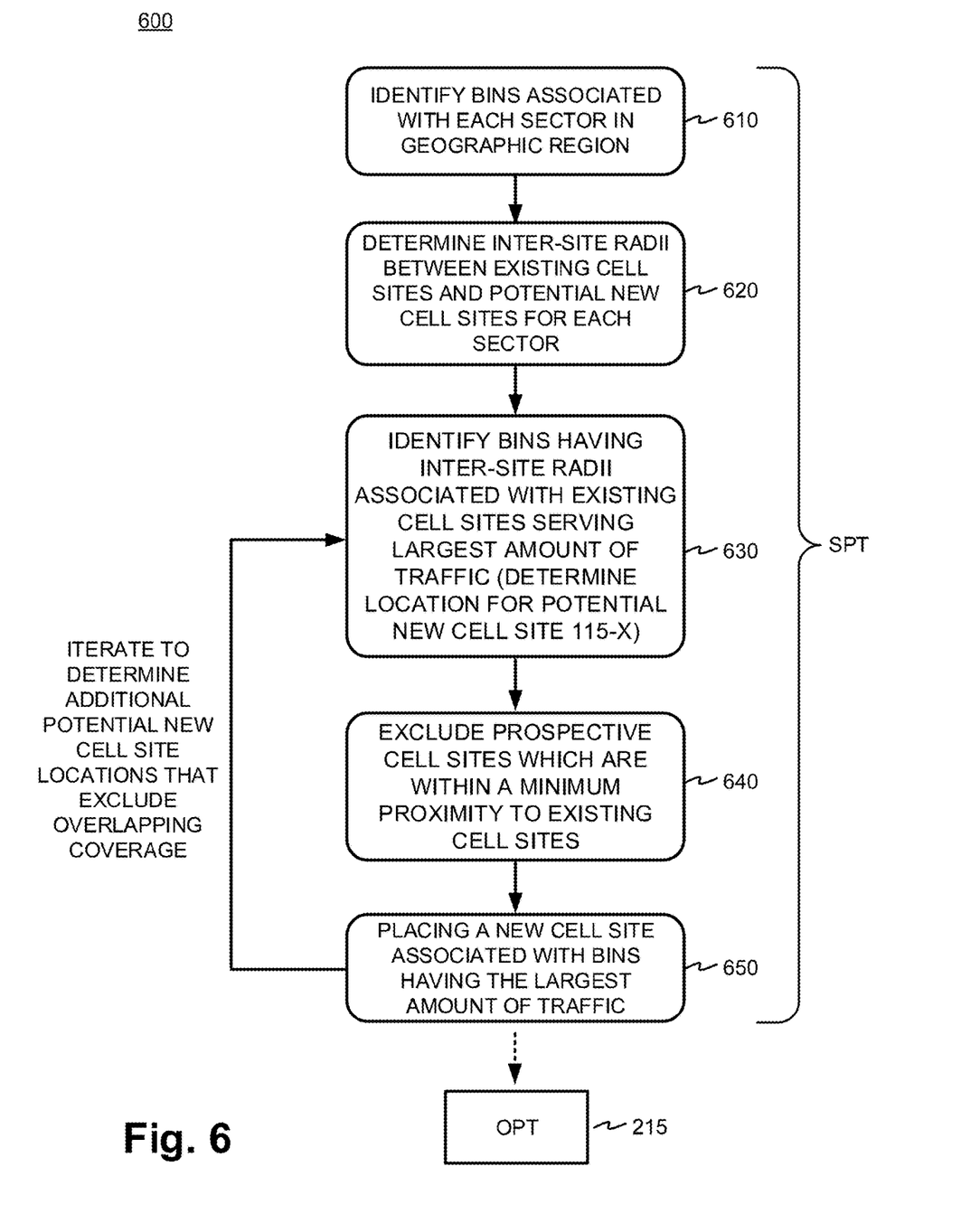
FIG. 6 is a flow chart of an exemplary process for solution placement tool (SPT) for recommending locations and types of potential new cell site placements.

FIG. 6 is a flow chart illustrating an exemplary process 600 associated with SPT 210 and includes generating recommendations (e.g., locations, cell site types, and/or operating parameters) for potential new cell sites 115. Process 600 may be performed by network device 400, which may be external to core 120 (e.g., implemented in URS 124), and execute instructions on processor 420 for performing solution placement in geographical region 105, operating parameter selection, and/or type recommendations of potential new cell sites 115 for WWAN 100. Alternatively, in another embodiment, network device 400 may be embodied as a network element residing in core 120 and perform additional standard network core functions in addition to performing process 600. Processor 420 may identify recommendations for locations of potential new cell sites 115 by identifying bins 107 associated with each sector in the geographical region (Block 610). Processor 420 may then determine for each sector, inter-site radii between existing cell sites 110 and potential new cell sites 115 (Block 620). Thus, in Blocks 610 and 620, bins 107 may be analyzed and assigned acceptable radii relative to existing cell sites 110. In an embodiment, SPT 210 may average the distance between three existing cell sites 110 and a potential new cell site 115-*x* for each type of cell site (e.g., small cell, macro cell, etc.).

Figure 7A:
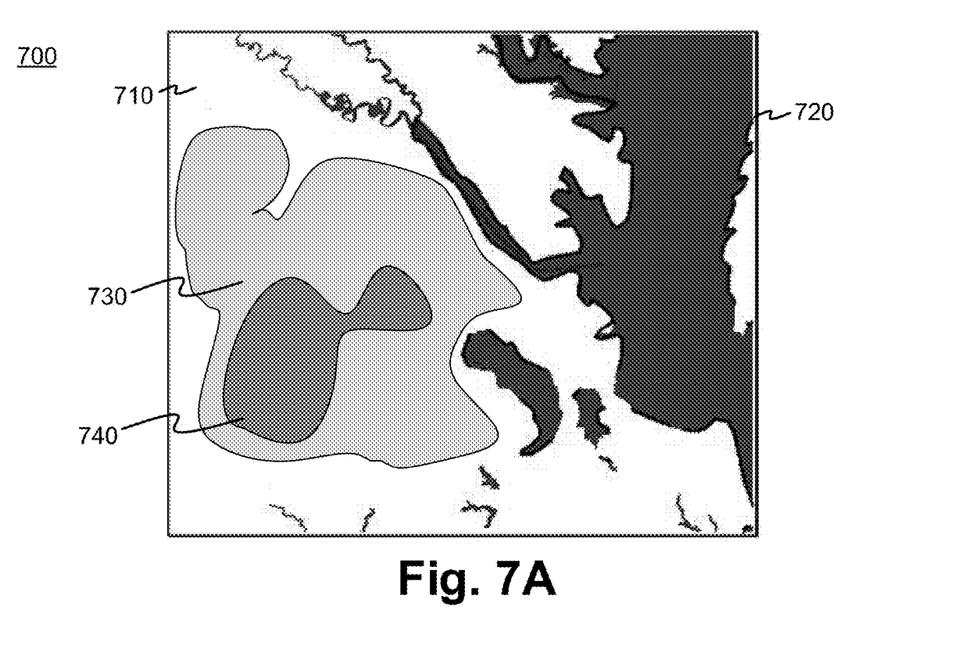
FIG. 7A-7C are diagrams of a region illustrating various stages of a process for recommending upgrades for a WWAN.
Figure 7B:
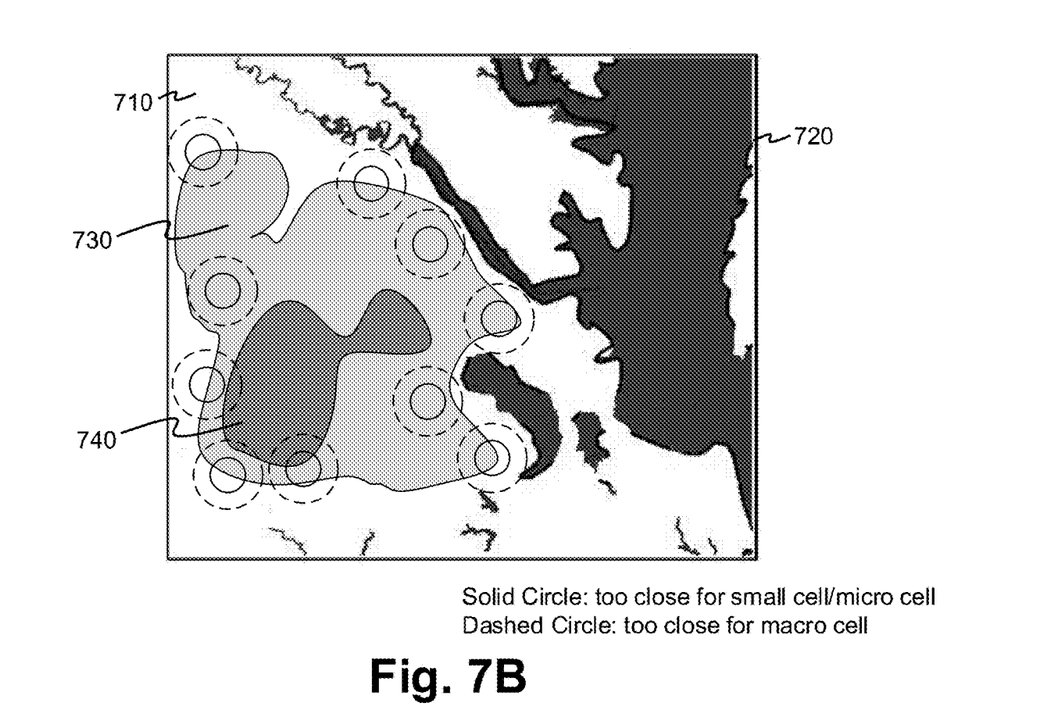
Figure 7C:
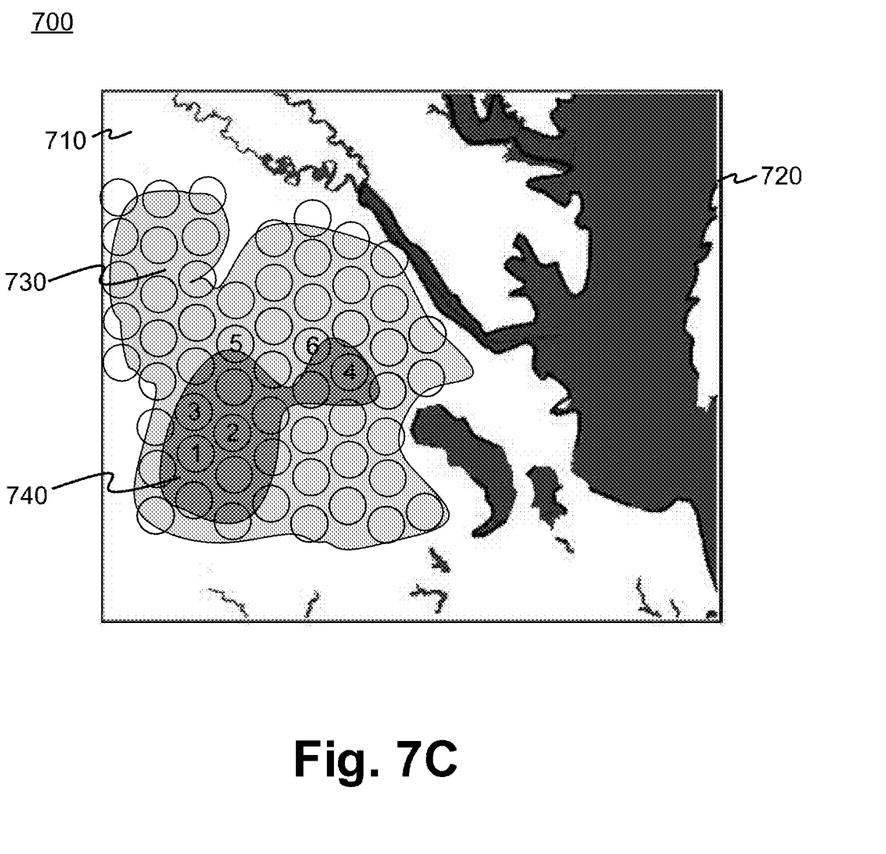

Further referring to FIG. 6, processor 420 may identify bins having inter-site radii which are associated with the existing cell sites 110 that serve the largest amount of traffic to determine locations for potential new cell sites 115 (Block 630). As an illustrative example, a region 700 is shown in FIGS. 7A-7C, where region 700 includes land areas 710 and water areas 720. As shown in FIG. 7A, areas 730 and 740 correspond to radii having different traffic densities. For example, the lighter area 730 is associated with radii having lower data traffic flows, and the darker area 740 is associated with radii having higher data traffic flows. With respect to FIG. 7A, process 600 in Block 630 may identify bins in area 740 for potential new cell sites 115 as radii within area 740 that are associated with higher data traffic flows. In an embodiment, data traffic flow may be based on geospatial key performance indicators (KPIs) which may include time-slot data, radio resource control (RRC) data, the type of cell site, etc.)

Further referring to FIG. 6, processor 420 may exclude potential new cell sites 115 which are within a minimum proximity to existing cell sites 110 (Block 640). Accordingly, processor 420 may prevent placing potential new cell sites 115 too close to existing cell sites 110, regardless of the amount of the traffic flow in existing cell sites 110. Potential new cell sites 115 may be "too close" to existing cell sites 110 depending upon the RF frequencies, structural characteristics (e.g., monopole, utility pole, etc.), and deployment type (e.g., macro-cell, micro-cell, etc.) of a potential new cell site 115 deployment. For example, lower frequencies may propagate further, therefore having a higher likelihood of causing interference if spaced "too close." As shown in FIG. 7B, concentric circles are drawn around existing cell sites 110 in both lower traffic flow area 730 and higher traffic flow area 740. The solid (smaller) circles delineate areas too close to an existing cell site 110 for the placement of a new small cell and/or micro cell site. The dashed circles shown in FIG. 7B delineate areas too close to an existing cell site 110 for a macro cell site.

Processor 420 may select a new cell site 115-X associated with bins having the largest amounts of traffic (Block 650). Additional potential new cell site placements 115, each subsequent one being associated with lesser data traffic flow, may be determined iteratively by looping through Blocks 630 through 650 as shown in FIG. 6. Once all of the potential new cell site 115 placements are determined, SPT 210 data may be forwarded to OPT 215.

As shown in FIG. 7C, the candidate map 700 illustrates potential new cell site 115 placements shown as circles in regions 730 and 740. Moreover, the potential new cell site placements may be ranked in order of highest data traffic, and labeled accordingly. For example, as shown in FIG. 7C, circles labeled 1, 2, 3, and 4, which reside completely in area 740, are the top four potential new cell site 115 locations in terms of highest data traffic flow. Circles labeled 5 and 6, which straddle areas 730 and 740, and are ranked lower in terms of data traffic (e.g., 5 and 6) than the circles residing in area 740. Additionally, process 600 may predict or generate network settings of the potential new cell sites. 115, such as, for example, the cell type (e.g., macro cell, micro cell, femto cell, etc.) and the expected transmission radius associated with the cell type.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5-6, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving parameters associated with an existing network configuration, customer usage, and a network demand;
determining candidates for recommendations of locations for potential new cell sites, the locations corresponding to sectors within a geographical region associated with the network, wherein the determining is based on the existing network configuration and customer usage and wherein the sectors correspond to portions of existing cell sites;
predicting a performance impact on the network based on the determined candidates for recommendations of locations for potential new cell sites, wherein the predicting comprises determining an offload potential corresponding to a reduction in traffic for existing cell sites based on the determined candidates; and
selecting network upgrades based on the recommendations for potential new cell site locations, the network demand, and the predicted performance impact, wherein the selecting network upgrades further comprises:
identifying first areas of the geographical region having a higher traffic than second areas of the geographical region,
identifying potential new cell sites located within the first areas,
excluding potential new cell sites located within a predetermined proximity to an existing cell site, and
selecting, based on the determined offload potential, at least one new cell site location.

2. The method of claim 1, further comprising wherein the identifying potential new cell sites comprises:
identifying bins associated with each sector in the geographical region; and
determining, for each sector, inter-site radii between the existing cell sites and potential new cell sites.

3. The method of claim 2, further comprising:
identifying bins having inter-site radii which are associated with the existing cell sites that serve a largest amount of traffic to determine locations for potential new cell sites;
and
selecting a new cell site associated with bins having the largest amount of traffic.

4. The method of claim 3, further comprising:
selecting additional new cell site placements iteratively which exclude overlapping wireless coverage, wherein each additional new cell site placement is associated with reduced traffic for the existing cell sites.

5. The method of claim 1, wherein the existing network configuration comprises at least one of existing wireless coverage, existing cell site locations, time slot data, or radio resource control (RRC) data.

6. The method of claim 1, further comprising:
predicting network settings of new cell sites.

7. The method of claim 1, wherein selecting network upgrades comprises:
determining an optimal cell site upgrade based on at least one of forecasted capacity triggers, cellular market constraints, operational feasibility constraints, time implementation constraints, site configuration, or available spectrum.

8. The method of claim 7, wherein determining the optimal cell site upgrade includes at least one of adding additional transmission paths transmitters, providing additional carriers, improving a cell antenna, providing additional spectrum, or providing an additional cell site.

9. A device, comprising:
a transceiver that communicates over a wireless channel;
a memory configured to store instructions; and
a processor, coupled to the transceiver and the memory, wherein the processor is configured to execute the instructions stored in the memory to:
receive parameters associated with an existing network configuration, customer usage, and a network demand,
determine candidates for recommendations of locations for potential new cell sites, the locations corresponding to sectors within a geographical region associated with the network, wherein the determining is based on the existing network configuration and customer usage and wherein the sectors correspond to portions of existing cell sites,
predict a performance impact on the network based on the determined candidates for recommendations of locations for potential new cell sites, wherein the instructions further cause the processor to determine an offload potential corresponding to a reduction in traffic for existing cell sites based on the determined candidates, and
select network upgrades based on the recommendations for potential new cell site locations, the network demand, and the predicted performance impact, wherein the instructions to select network upgrades further include instructions to cause the processor to:
identify first areas of the geographical region having a higher traffic than second areas of the geographical region,
identify potential new cell sites located within the first areas,
exclude potential new cell sites located within a predetermined proximity to an existing cell site, and
select, based on the determined offload potential, at least one new cell site location.

10. The device of claim 9, wherein the instructions to identify potential new cell sites further cause the processor to:
identify bins associated with each sector in the geographical region; and
determine, for each sector, inter-site radii between the existing cell sites and potential new cell sites.

11. The device of claim 10, wherein the instructions further cause the processor to:
identify bins having inter-site radii which are associated with the existing cell sites that serve a largest amount of traffic to determine locations for potential new cell sites;
and
select a new cell site associated with bins having the largest amount of traffic.

12. The device of claim 11, wherein the instructions further cause the processor to:
select additional new cell site placements iteratively which exclude overlapping coverage, wherein each additional new cell site placement is associated with reduced traffic for the existing cell sites.

13. The device of claim 9, wherein the existing network configuration comprises at least one of existing wireless coverage, existing cell site locations, time slot data, or radio resource control (RRC) data.

14. The device of claim 9, wherein instructions further cause the processor to predict network settings of new cell sites.

15. The device of claim 9, wherein instructions to select network upgrades further causes the processor to:
determine an optimal cell site upgrade based on at least one of forecasted capacity triggers, cellular market constraints, operational feasibility constraints, time implementation constraints, site configuration, or available spectrum.

16. The device of claim 15, wherein determining the optimal cell site upgrade includes at least one of adding additional transmission paths, providing additional carriers, improving a cell antenna, providing additional spectrum, or providing an additional cell site.

17. A non-transitory computer-readable medium comprising instructions, which, when executed by a processor, cause the processor to:
receive parameters associated with an existing network configuration, customer usage, and a network demand;
determine candidates for recommendations of locations for potential new cell sites, the locations corresponding to sectors within a geographical region associated with the network, wherein the determining is based on the existing network configuration and customer usage;
predict a performance impact on the network based on the determined candidates for recommendations of locations for potential new cell sites, wherein the instructions further cause the processor to determine an offload potential corresponding to a reduction in traffic for existing cell sites based on the determined candidates; and
select network upgrades based on the recommendations for potential new cell site locations, the network demand, and the predicted performance impact, wherein the instructions to select network upgrades further cause the processor to:
identify first areas of the geographical region having a higher traffic than second areas of the geographical region, identify potential new cell sites located within the first areas, exclude potential new cell sites located within a predetermined proximity to an existing cell site, and select, based on the determined offload potential, at least one new cell site location.

18. The non-transitory computer-readable medium of claim 17, wherein the instructions to identify potential new cell sites further cause the processor to:

identify bins associated with each sector in the geographical region; and determine, for each sector, inter-site radii between the existing cell sites and potential new cell sites.

19. The method of claim 1, further comprising:

producing a ranked list for locations of the potential new cell sites, wherein the ranked list is based upon an improvement each potential new cell site provides with respect to traffic exchanged by the existing cell sites.

20. The device of claim 9, wherein the instructions further cause the processor to:

produce a ranked list for locations of the potential new cell sites, wherein the ranked list is based upon an improvement each potential new cell site provides with respect to traffic exchanged by the existing cell sites.

* * * * *